United States Patent
Kozuka

(10) Patent No.: US 10,777,829 B2
(45) Date of Patent: Sep. 15, 2020

(54) FUEL CELL SYSTEM

(71) Applicant: TOYOTA JIDOSHA KABUSHIKI KAISHA, Toyota-shi, Aichi-ken (JP)

(72) Inventor: Tomoyuki Kozuka, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 254 days.

(21) Appl. No.: 15/950,680

(22) Filed: Apr. 11, 2018

(65) Prior Publication Data

US 2018/0301722 A1 Oct. 18, 2018

(30) Foreign Application Priority Data

Apr. 18, 2017 (JP) .................. 2017-081705

(51) Int. Cl.
*H01M 8/04* (2016.01)
*H01M 8/04223* (2016.01)
*H01M 8/04228* (2016.01)
*H01M 8/04119* (2016.01)
*H01M 8/04303* (2016.01)
*H01M 8/04828* (2016.01)
*H01M 8/04955* (2016.01)
*H01M 8/0432* (2016.01)
(Continued)

(52) U.S. Cl.
CPC ..... *H01M 8/04253* (2013.01); *H01M 8/0432* (2013.01); *H01M 8/04119* (2013.01); *H01M 8/04164* (2013.01); *H01M 8/04228* (2016.02); *H01M 8/04303* (2016.02); *H01M 8/04753* (2013.01); *H01M 8/04835* (2013.01); *H01M 8/04947* (2013.01); *H01M 8/04955* (2013.01); *H01M 8/04097* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| 2005/0110446 A1 | 5/2005 | Kagami et al. |
| 2005/0112014 A1* | 5/2005 | Shiromaru .......... F04C 29/0092 418/206.1 |

(Continued)

FOREIGN PATENT DOCUMENTS

| JP | 2005-155409 A | 6/2005 |
| JP | 2007-005289 A | 1/2007 |
| JP | 2007-059333 A | 3/2007 |

*Primary Examiner* — Tracy M Dove
(74) *Attorney, Agent, or Firm* — Dickinson Wright PLLC

(57) ABSTRACT

In a fuel cell system, a circulation pump provided in a circulation flow path is a two-lobe roots pump configured such that two rotors rotate in opposite directions. An exhaust/drainage portion is provided at a bottom in an internal space of a gas liquid separator provided in the circulation flow path and is configured to collect a liquid separated by the gas liquid separator and discharge the collected liquid via a discharge valve. The gas liquid separator includes an opening that is connected with the circulation pump and that is configured to face in a direction of the exhaust/drainage portion. At a system stop time, when a predetermined condition is satisfied, a controller configured to control operation of the circulation pump causes the rotors of the circulation pump to be rotated in reverse directions from rotations at a system operation time.

5 Claims, 9 Drawing Sheets

(51) Int. Cl.
*H01M 8/04746* (2016.01)
*H01M 8/04089* (2016.01)

(56) References Cited

U.S. PATENT DOCUMENTS

| | | | | |
|---|---|---|---|---|
| 2007/0177999 | A1* | 8/2007 | Fujii | F04C 18/126 417/410.1 |
| 2009/0047163 | A1* | 2/2009 | Fujita | F04C 18/126 418/206.1 |
| 2017/0069922 | A1* | 3/2017 | Yamanaka | H01M 8/04097 |

* cited by examiner

FUEL CELL SYSTEM

CROSS-REFERENCE TO RELATED APPLICATIONS

The present application claims the priority based on Japanese Patent Application No. 2017-081705 filed on Apr. 18, 2017, the disclosure of which is hereby incorporated by reference in its entirety.

BACKGROUND

Field

The present disclosure relates to a fuel cell system.

Related Art

JP 2007-59333A and JP 2007-5289A disclose fuel cell systems in which a roots pump configured such that two rotors rotate in opposite directions is used as a hydrogen pump provided to supply hydrogen gas to a fuel cell. In the fuel cell system described in JP 2007-5289A, the hydrogen pump is reversely rotated at a system stop time to feed the hydrogen gas in a direction toward a gas liquid separator. This causes water in a flow path including the hydrogen pump and a piping connected with the hydrogen pump to be discharged via the gas liquid separator and an exhaust/drainage valve and thereby accelerates discharge of water to the outside. In the fuel cell system described in JP 2007-59333A, the rotors are reciprocated at a system stop time to remove the water content adhering to the rotors and thereby prevent the hydrogen pump from being frozen.

The fuel cell system including the gas liquid separator as described in JP 2007-5289A, however, has the following problem. The exhaust/drainage valve is connected with the gas liquid separator at a position that is generally in a bottom of an internal space of the gas liquid separator (hereinafter called "exhaust/drainage portion"), for the efficient water drainage. Accordingly, liquid water remains in the exhaust/drainage portion, for example, when the water drainage fails to completely remove the liquid water or when dew condensation occurs in the internal space with a decrease in temperature. When this remaining water is frozen, the water in the flow path including the hydrogen pump cannot be discharged to the outside. The fuel cell system is thus likely to be inoperable.

In order to address the problems described above, the disclosure may be implemented by aspects described below.

SUMMARY

According to one aspect of the present disclosure, there is provided a fuel cell system. This fuel cell system comprises a fuel cell; a supply flow path configured to supply a fuel gas to a supply port of an anode of the fuel cell; a circulation flow path configured to resupply a discharge gas that is discharged from a discharge port of the anode, as the fuel gas to the supply port; a gas liquid separator provided in the circulation flow path and configured to separate the discharged gas into a gas and a liquid; a circulation pump provided in the circulation flow path and configured to supply the gas separated by the gas liquid separator to the supply flow path; a discharge valve connected with the gas liquid separator and configured to discharge the separated liquid from the gas liquid separator; and a controller configured to control operation of the circulation pump. The circulation pump is a two-lobe roots pump configured such that two rotors rotate in opposite directions. An exhaust/drainage portion is provided at a bottom in an internal space of the gas liquid separator and is configured to collect the separated liquid and discharge the collected liquid via the discharge valve. The gas liquid separator includes an opening that is connected with the circulation pump and that is configured to face in a direction of the exhaust/drainage portion. At a system stop time, when a predetermined condition is satisfied, the controller causes the rotors of the circulation pump to be rotated in reverse directions from rotations at a system operation time.

DETAILED DESCRIPTION

A. First Embodiment

Figure 1:
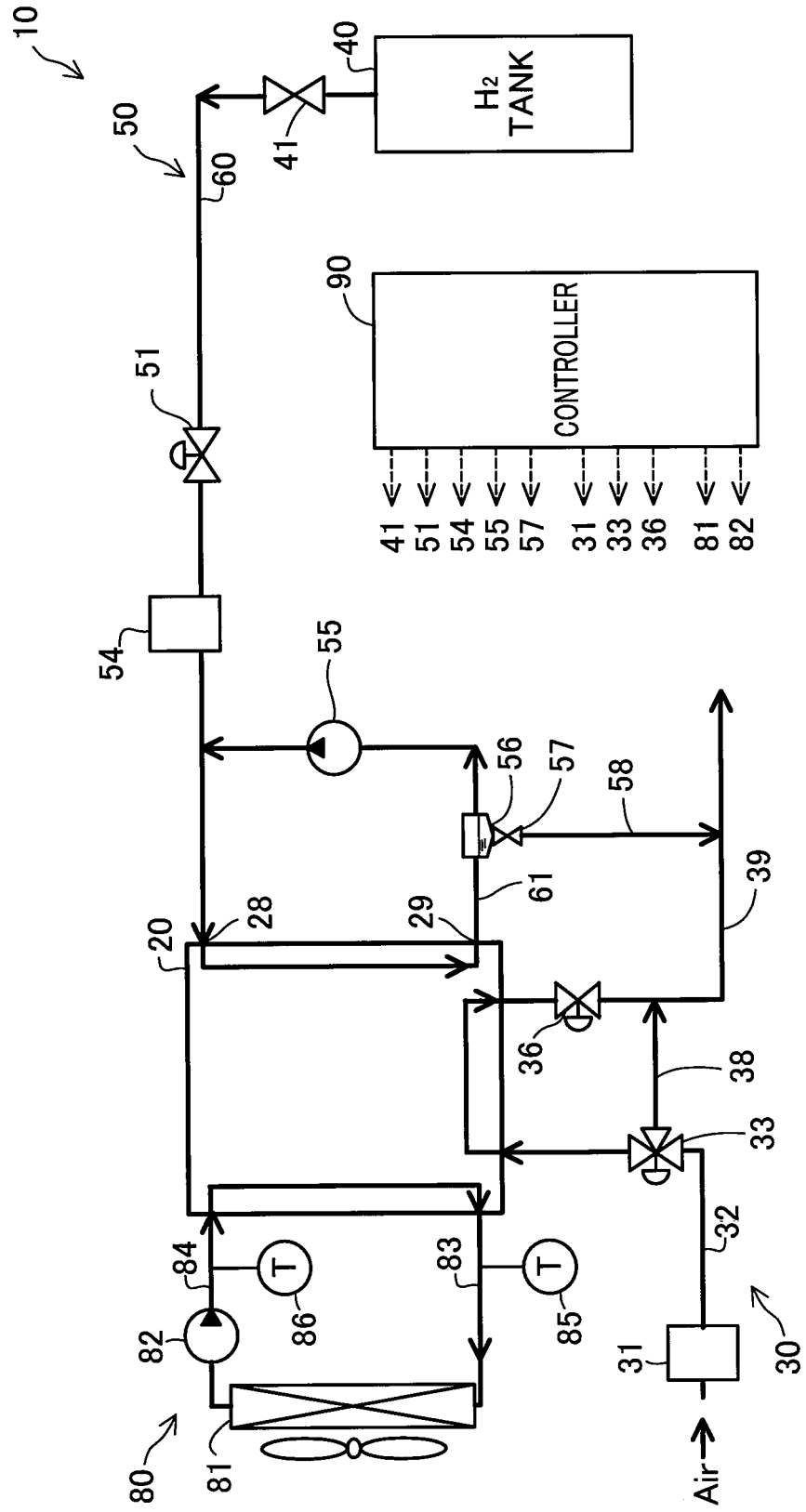
FIG. 1 is a diagram illustrating the schematic configuration of a fuel cell system according to a first embodiment of the present disclosure.

FIG. 1 is a diagram illustrating the schematic configuration of a fuel cell system 10 according to a first embodiment of the present disclosure. The fuel cell system 10 is mounted on, for example, a vehicle to output electric power as a power source of the vehicle in response to the driver's request. The fuel cell system 10 includes a fuel cell 20 having a plurality of cells, a hydrogen supply discharge mechanism 50, an air supply discharge mechanism 30, a cooling water circulation mechanism 80 and a controller 90. The fuel cell system 10 is started in response to an ON operation of a power switch (not shown) and is stopped in response to an OFF operation of the power switch. The power switch corresponds to an ignition switch of an engine vehicle and serves as an input interface to switch over between the stop state and the operating state of the fuel cell system 10.

The hydrogen supply discharge mechanism 50 is under control of the controller 90 to supply hydrogen (fuel gas) to an anode of the fuel cell 20 and discharge a gas including unreacted hydrogen from the anode. The hydrogen supply discharge mechanism 50 includes a hydrogen tank 40, a shutoff valve 41, a hydrogen supply flow path 60, a regulator 51, an injector 54, a hydrogen circulation flow path 61, a hydrogen pump 55, a gas liquid separator 56, a drainage shutoff valve 57 and a discharge flow path 58.

The hydrogen tank 40 is configured to store hydrogen. The high-pressure hydrogen gas having several tens of MPa is stored in the hydrogen tank 40. The hydrogen supply flow path 60 is a piping arranged to connect the hydrogen tank 40 with a supply port 28 of the anode of the fuel cell 20. The shutoff valve 41 serves as a valve to shut off the supply of hydrogen from the hydrogen tank 40 to the hydrogen supply flow path 60 and is also called main stop valve. The shutoff valve 41 is controlled to be opened and closed by the controller 90. When the shutoff valve 41 is controlled by the controller 90 to be opened, the hydrogen gas is supplied from the hydrogen tank 40 through the hydrogen supply flow path 60 to the supply port 28 of the anode of the fuel cell 20. When the shutoff valve 41 is controlled by the controller 90 to be closed, the supply of the hydrogen gas to the supply port 28 of the anode is shut off.

The regulator 51 is controlled by the controller 90 to regulate the pressure of the hydrogen stored in the hydrogen tank 40. The injector 54 is controlled by the controller 90 to inject the hydrogen of the pressure regulated by the regulator 51 toward the anode.

The hydrogen circulation flow path 61 is a piping connected with the hydrogen supply flow path 60 at a position on the fuel cell 20-side of the injector 54. The hydrogen circulation flow path 61 and the hydrogen supply flow path 60 connect a discharge port 29 of the anode of the fuel cell 20 with the supply port 28 of the anode. The hydrogen circulation flow path 61 is provided with the gas liquid separator 56 and the hydrogen pump 55. The gas liquid separator 56 serves to separate a discharged gas from the discharge port 29 of the anode into a gas and a liquid. The hydrogen pump 55 is configured to resupply the gas separated by the gas liquid separator 56 to the fuel cell 20. The gas separated by the gas liquid separator 56 mainly includes hydrogen that is not consumed but that is discharged from the anode, nitrogen that is transmitted from a cathode side through a membrane electrode assembly of the fuel cell and that is discharged from the anode, and moisture that is not separated by the gas liquid separator 56. The discharge flow path 58 is a piping arranged to connect the gas liquid separator 56 with an air discharge flow path 39 (described later) included in the air supply discharge mechanism 30. The drainage shutoff valve 57 is provided on the discharge flow path 58. The drainage shutoff valve 57 is opened to discharge the liquid separated by the gas liquid separator 56 and nitrogen and the like. The injector 54 and the drainage shutoff valve 57 are controlled to regulate the supply amount of hydrogen to the fuel cell 20. The hydrogen pump 55 is also called "circulation pump". The drainage shutoff valve 57 is also called "discharge valve". The shutoff valve 41, the regulator 51, the injector 54, the hydrogen pump 55 and the drainage shutoff valve 57 are controlled by the controller 90.

The air supply discharge mechanism 30 is under control of the controller 90 to supply and discharge the air to and from a cathode of the fuel cell 20. The air supply discharge mechanism 30 includes a compressor 31, an air supply flow path 32, a flow dividing valve 33, a pressure regulator 36, a bypass flow path 38, and an air discharge flow path 39.

The air supply flow path 32 is a piping connected with a supply port of the cathode of the fuel cell 20. The air discharge flow path 39 is a piping connected with a discharge port of the cathode of the fuel cell 20. The bypass flow path 38 is a piping branched off from the air supply flow path 32 at a position on an upstream side of the fuel cell 20 and connected with the air discharge flow path 39. The compressor 31 is provided in the middle of the air supply flow path 32 to take in the air from an open air port of the air supply flow path 32 and compress the intake air. The compressor 31 is provided at a position that is closer to the open air port than a connecting position of the air supply flow path 32 with the bypass flow path 38.

The flow dividing valve 33 is provided on a downstream side of the compressor 31 in the air supply flow path 32, or more specifically provided between the compressor 31 and the fuel cell 20 to be located at the connecting position of the air supply flow path 32 with the bypass flow path 38. The flow dividing valve 33 serves to change over the flow direction of the air flowing from the compressor 31 between the fuel cell 20-side and the bypass flow path 38-side. This flow dividing valve 33 is also called three-way valve. The bypass flow path 38 is a piping arranged to connect the flow dividing valve 33 with the air discharge flow path 39. The pressure regulator 36 is provided in the air discharge flow path 39 to be located at a position on the fuel cell 20-side of a connecting position of the air discharge flow path 39 with the bypass flow path 38. The pressure regulator 36 serves to regulate a flow passage area of the air discharge flow path 39 according to its opening position. The air passing through the pressure regulator 36 goes through the connecting position of the air discharge flow path 39 with the bypass flow path 38 and is discharged from an open air port to the open air. The compressor 31, the flow dividing valve 33 and the pressure regulator 36 are controlled by the controller 90.

The cooling water circulation mechanism 80 is under control of the controller 90 to cool down the fuel cell 20. The cooling water circulation mechanism 80 includes a radiator 81, a cooling water pump 82, a cooling water discharge flow path 83 and a cooling water supply flow path 84.

The cooling water supply flow path 84 is a flow path arranged to connect the radiator 81 with the fuel cell 20 and is a piping provided to supply cooling water to the fuel cell 20. The cooling water discharge flow path 83 is a flow path arranged to connect the fuel cell 20 with the radiator 81 and is a piping provided to discharge cooling water from the fuel cell 20. The cooling water pump 82 is provided in the cooling water supply flow path 84 between the radiator 81 and the fuel cell 20 and serves to circulate the cooling water. The operations of the radiator 81 and the cooling water pump 82 are controlled by the controller 90 according to temperatures measured by thermometers 85 and 86 provided in the cooling water discharge flow path 83 and in the cooling water supply flow path 84.

The controller 90 is configured as a computer including a CPU, a RAM and a ROM and is more specifically configured by an ECU (electronic control unit). The controller 90 outputs signals to control the operations of the fuel cell system 10. In response to a power generation request, the controller 90 controls the respective parts of the fuel cell system 10 to cause the fuel cell 20 to generate electric power. The controller 90 also performs an exhaust/drainage process described later at a stop of the system.

The fuel cell system 10 mounted on the vehicle further includes a secondary battery and a DC/DC converter configured to control the output voltage of the fuel cell 20 and control charging and discharging of the secondary battery, although not being specifically illustrated or described in detail. The secondary battery is configured to store the electric power output from the fuel cell 20 and the regenerative power and serves as the power source along with the fuel cell 20.

Figure 2:
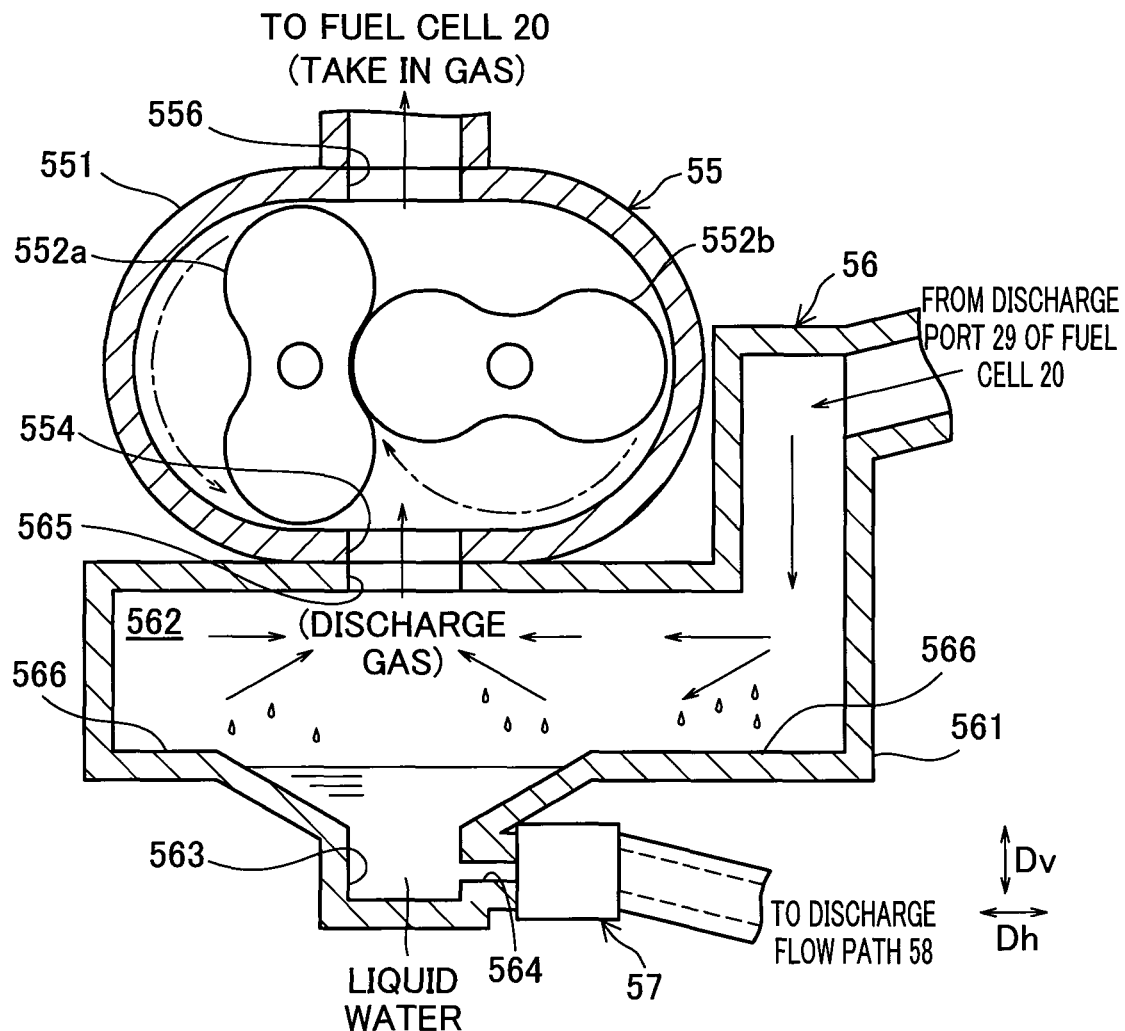
FIG. 2 is a schematic configuration diagram illustrating a positional relationship between a hydrogen pump, a gas liquid separator, and a drainage shutoff valve.

FIG. 2 is a schematic configuration diagram illustrating a positional relationship between the hydrogen pump 55, the gas liquid separator 56, and the drainage shutoff valve 57. FIG. 2 illustrates the hydrogen pump 55 and the gas liquid separator 56 in a perspective view to show the inside thereof with respective casings 551 and 561 hatched. A direction Dv indicates a vertical direction, and a direction Dh indicates a horizontal direction.

The gas liquid separator 56 includes an internal space 562 which the discharged gas from the fuel cell 20 flows in. The internal space 562 includes an approximately funnel shape part. An exhaust/drainage portion 563 is provided at a bottom in the middle of the approximately funnel shape part. A liquid receiving surface 566 is provided on an outer circumferential side of the exhaust/drainage portion 563 to be located above the exhaust/drainage portion 563. The drainage shutoff valve 57 is connected with the exhaust/drainage portion 563 via a communication path 564 that is provided in a side wall of the exhaust/drainage portion 563. The liquid separated from the discharged gas that is discharged from the discharge port 29 of the anode (i.e., liquid water) is accumulated in the internal space 562. The exhaust/drainage portion 563 is configured to collect the liquid water accumulated in the internal space 562 and discharge the liquid water via the communication path 564 and the drainage shutoff valve 57. The liquid receiving surface 566 serves to receive and hold the liquid water blown off by a sprayed gas as described later.

The hydrogen pump 55 is placed on an upper face of the casing 561 of the gas liquid separator 56. An opening 565 is provided in the casing 561 of the gas liquid separator 56 to be located in a region where the hydrogen pump 55 is placed. More specifically, the opening 565 is provided at a position above the exhaust/drainage portion 563 in the vertical direction Dv to be opposed to the exhaust/drainage portion 563 of the gas liquid separator 56. The opening 565 is connected with an intake port 554 of the hydrogen pump 55. The opening 565 is also called "opening connected with the circulation pump".

The hydrogen pump 55 used is a two-lobe roots pump including two rotors 552a and 552b inside of the casing 551. The roots pump is a pump configured to rotate the two rotors 552a and 552b in opposite directions simultaneously with rotation of a motor (not shown) and thereby generate a gas stream according to the directions of rotations. Rotating shafts of the two rotors 552a and 552b are arranged along a horizontal direction that is perpendicular to the horizontal direction Dh shown in FIG. 2 (i.e., direction perpendicular to the sheet surface). The gas stream generated by the rotations of the rotors 552a and 552b mostly flows in a direction along the vertical direction Dv.

At a system operation time when power generating operation is performed, the hydrogen pump 55 discharges the gas that is taken in from the intake port 554, from a discharge port 556 provided above the intake port 554 in the vertical direction Dv. At the system operation time, the hydrogen pump 55 rotates the two rotors 552a and 552b such as to generate a gas stream from the gas liquid separator 56 toward the hydrogen pump 55. The rotating directions are shown by one-dot chain line arrows in FIG. 2. The rotations of the pair of rotors 552a and 552b of the hydrogen pump 55 in this state are called "HP normal rotation", and the gas stream generated by this rotation is called "gas stream in a normal direction". The discharged gas that is discharged from the discharge port 29 of the anode of the fuel cell 20 accordingly flows into the internal space 562 of the gas liquid separator 56 and is separated into the gas and the liquid (liquid water). The separated gas is taken in through the opening 565 and the intake port 554 by the hydrogen pump 55 and is discharged from the discharge port 556 to be resupplied to the fuel cell 20. Solid line arrows shown in FIG. 2 indicate the outline of the gas stream in the gas liquid separator 56 and the hydrogen pump 55.

The hydrogen pump 55 is also configured such that the two rotors 552a and 552b are rotated in reverse directions from those at the system operation time by reverse rotation of the motor (not shown), so as to generate a downward gas stream from the hydrogen pump 55 toward the gas liquid separator 56. The rotations of the pair of rotors 552a and 552b of the hydrogen pump 55 in this state are called "HP reverse rotation", and the gas stream generated by this rotation is called "gas stream in a reverse direction". An operation of reversely rotating the hydrogen pump 55 to generate the gas stream in the reverse direction" is performed in a remaining water removal process in a system stop time as described later.

A procedure of terminating the system operation to stop the system first performs a purging operation. During the purging operation, the rotors 552a and 552b are rotated in the HP normal rotation continuously from the system operation time. This results in removing the water content accumulated in the fuel cell 20 and in the flow paths. After the purging operation, the drainage shutoff valve 57 is opened to discharge the liquid water accumulated in the internal space 562. After the rotation of the hydrogen pump 55 is stopped, the drainage shutoff valve 57 is closed, and the system stops operation. At the system stop time, a remaining water removal process described later is also performed.

Figure 3:
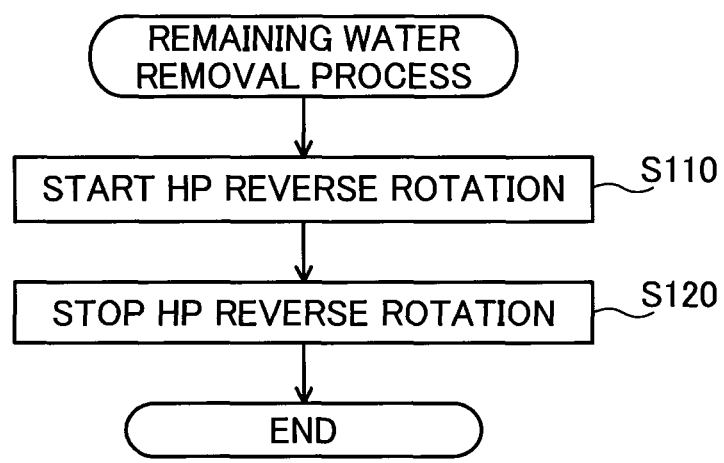
FIG. 3 is a flowchart showing a procedure of remaining water removal process performed at a system stop time.

FIG. 3 is a flowchart showing a procedure of remaining water removal process performed at the system stop time. The remaining water removal process is performed at the system stop time by the controller 90. In the remaining water removal process, the hydrogen pump 55 at a stop is started to reversely rotate at a predetermined rotating speed (rate of rotation) (step S110). After elapse of a predetermined time period, the controller 90 stops the reverse rotation of the hydrogen pump 55 (step S120) and terminates this process.

Figure 4:
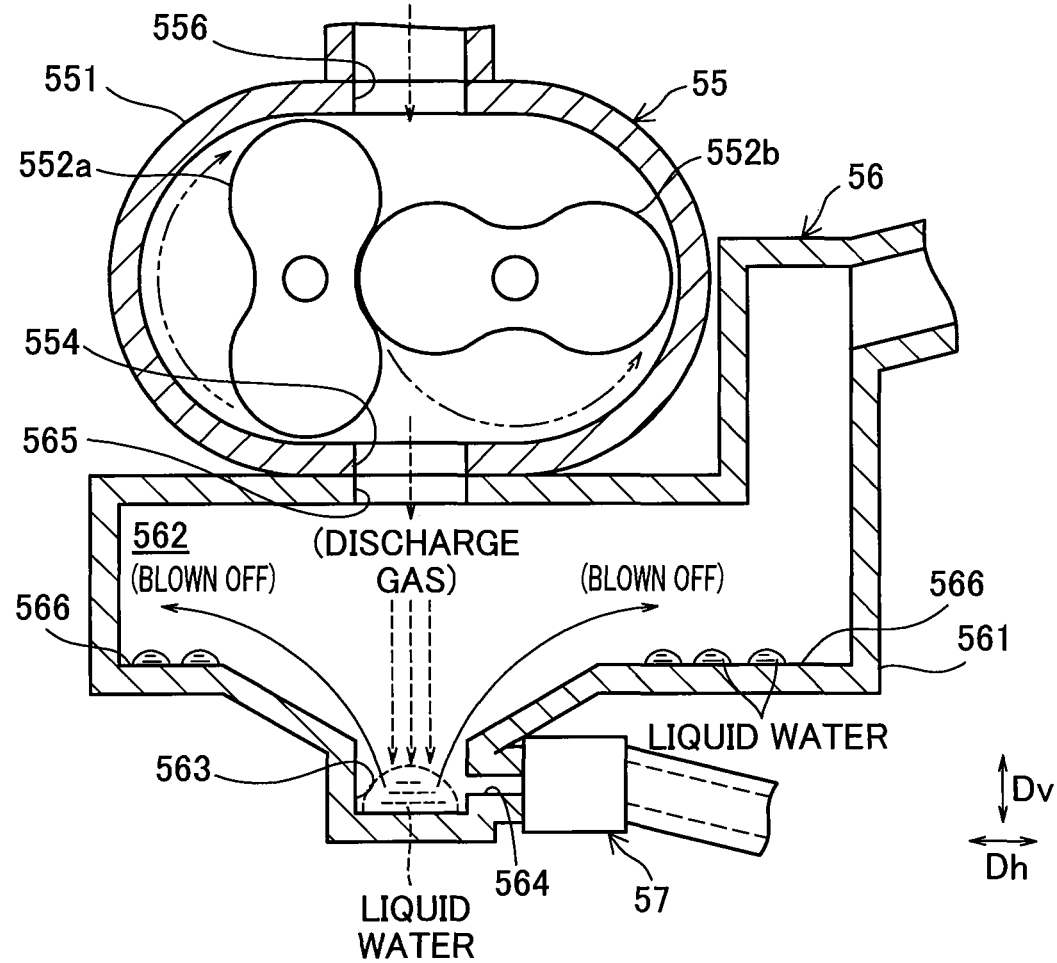
FIG. 4 is a diagram illustrating the state of the gas liquid separator during reverse rotation of the hydrogen pump.

FIG. 4 is diagram illustrating the state of the gas liquid separator 56 during reverse rotation of the hydrogen pump 55. When the hydrogen pump 55 is reversely rotated in directions shown by two-dot chain line arrows (HP reverse rotation) in FIG. 4, a gas stream in a reverse direction is generated from the opening 565 toward the exhaust/drainage portion 563 located below the opening 565 in the vertical direction Dv as shown by broken line arrows in FIG. 4. The liquid water accumulated in the hydrogen pump 55 is discharged from the hydrogen pump 55 to the gas liquid separator 56 by this gas stream in the reverse direction and the gravitational force. The gas from the opening 565 is sprayed onto the liquid water discharged from the hydrogen pump 55 and the remaining water accumulated in the exhaust/drainage portion 563, so as to blow off the remaining water along the funnel-shape inclined surface from the exhaust/drainage portion 563 as shown by solid line arrows.

The liquid receiving surface 566 configured to receive and hold the blown-off liquid water is provided on the outer circumferential side of the exhaust/drainage portion 563 to be located above the exhaust/drainage portion 563 as described above. The liquid receiving surface 566 is a horizontal plane (horizontal surface) along the horizontal direction Dh. The blown-off liquid water (liquid droplet) is thus unlikely to flow down to the exhaust/drainage portion 563 after adhering to the liquid receiving surface 566. The gas liquid separator 56 of the embodiment accordingly enables the blown-off liquid water to be received and held by the liquid receiving surface 566.

The rotating speed and the time duration of the HP reverse rotation may be set, for example, as described below. The rotating speed is set to be equal to or higher than a rotation speed that allows for generation of a gas stream that at least enables the gas to be sprayed from the opening 565 toward the remaining water accumulated in the exhaust/drainage portion 563 and to thereby blow off the remaining water. The rotating speed and the time duration of the HP reverse rotation are also set, such that the drainage shutoff valve 57 is not inoperable even when water remains in the exhaust/drainage portion 563 and is frozen. For example, when water remains in the exhaust/drainage portion 563 at a water level that does not cause the liquid water to enter the communication path 564, the maximum amount of water is determinable from the volume of the exhaust/drainage portion 563 located below the communication path 564. The amount of water after the blow-off of the gas by the HP reverse rotation may thus be set to a level that does not cause the drainage shutoff valve 57 to be inoperable even when the water is frozen. A relationship between the rotating speed and the time duration of the hydrogen pump 55 (i.e., a combination of the rotating speed and the time duration) may be determined in advance. The rotating speed and the time duration of the HP reverse rotation (S110 and S120 in FIG. 3) are set according to the determined relationship between the rotating speed and the time duration.

As described above, the hydrogen pump 55 and the gas liquid separator 56 of the embodiment are configured such that the hydrogen pump 55 is reversely rotated to generate the gas stream in the reverse direction and thereby blow off the remaining water in the exhaust/drainage portion 563 and that the blown-off remaining water is received and held by the liquid receiving surface 566. This configuration suppresses the liquid water from remaining in the exhaust/drainage portion 563. This accordingly suppresses the drainage shutoff valve 57 from being inoperable due to freezing of the remaining water in the exhaust/drainage portion 563 and thereby suppresses the fuel cell system 10 from being inoperable.

In the above description, the remaining water removal process shown in FIG. 3 is performed at the system operation time, and its start timing is not specified. The start timing of the remaining water removal process may, however, be specified as a timing when a predetermined condition, for example, one of conditions given below, is satisfied:

Condition 1: The system stops operation. In this case, the remaining water removal process is performed continuously after the stop of operation of the system; and Condition 2: An elapsed time or a system temperature exceeds a corresponding reference value after the stop of operation of the system. In this case, the remaining water removal process is performed some time after the stop of operation of the system. For example, after the stop of operation of the system, the system is naturally cooled down from the high temperature condition during the system operation. The remaining water removal process may be performed at a timing after the moisture vapor becomes liquid water due to dew condensation.

The remaining water removal process may be performed at any of various timings after some waiting, for example, after lapse of a predetermined time period or after the temperature of the system becomes lower than a predetermined temperature.

The temperature of the system may be any of various environmental temperatures, for example, the temperature of cooling water in the cooling water discharge flow path 83 measured by the thermometer 85, the temperature of cooling water in the cooling water supply flow path 84 measured by the thermometer 86, the temperature of the fuel cell 20, the temperature of the hydrogen pump 55, the temperature of the gas liquid separator 56, or the atmosphere temperature of the fuel cell system 10.

The predetermined condition is not limited to the above examples but may be any condition that determines the start timing of the remaining water removal process described above to remove the remaining water in the exhaust/drainage portion 563 at the system stop time.

Figure 5:
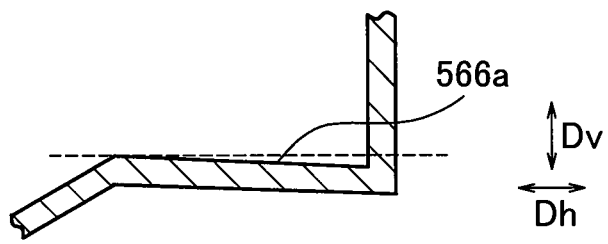
FIG. 5 is a schematic configuration diagram illustrating a liquid receiving surface according to a modification.
Figure 6:
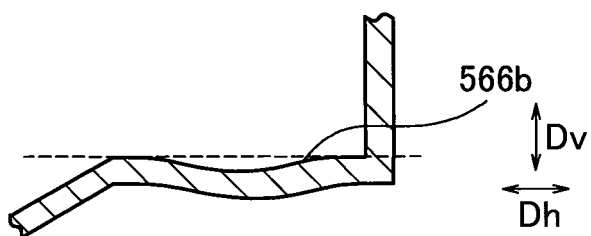
FIG. 6 is a schematic configuration diagram illustrating a liquid receiving surface according to another modification.

FIG. 5 and FIG. 6 are schematic configuration diagrams respectively illustrating a liquid receiving surface 566a and a liquid receiving surface 566b according to modifications. The liquid receiving surface 566 described above is configured to be a planar surface along the horizontal direction Dh. This configuration is, however, not restrictive.

The liquid receiving surface 566a of FIG. 5 is configured by a surface including an inclined surface that is inclined more downward toward the outer circumferential side to be lower in the vertical direction Dv on the outer circumferential side. This configuration of the liquid receiving surface 566a causes the liquid water to be accumulated on the outer circumferential side and makes it unlikely that the liquid water moves toward the exhaust/drainage portion 563. The inclined surface is not necessarily a planar surface but may be a curved surface inclined outward.

The liquid receiving surface 566b of FIG. 6 is configured to include a concave that is provided at the center in the horizontal direction and that is inclined downward in the vertical direction Dv. The liquid receiving surface 566b is accordingly configured such that liquid water is accumulated in the concave. The inclination of the concave may be set in a range of 0 degree to 90 degrees relative to the horizontal direction. The position of the concave is not limited to the center in the horizontal direction of the liquid receiving surface 566b but may be any position of the liquid receiving surface 566b. The liquid receiving surface 566b may be configured to be recessed as a whole. Accordingly, the liquid receiving surface may have any configuration that allows the blown-off liquid water to be received and held.

B. Second Embodiment

Figure 7:
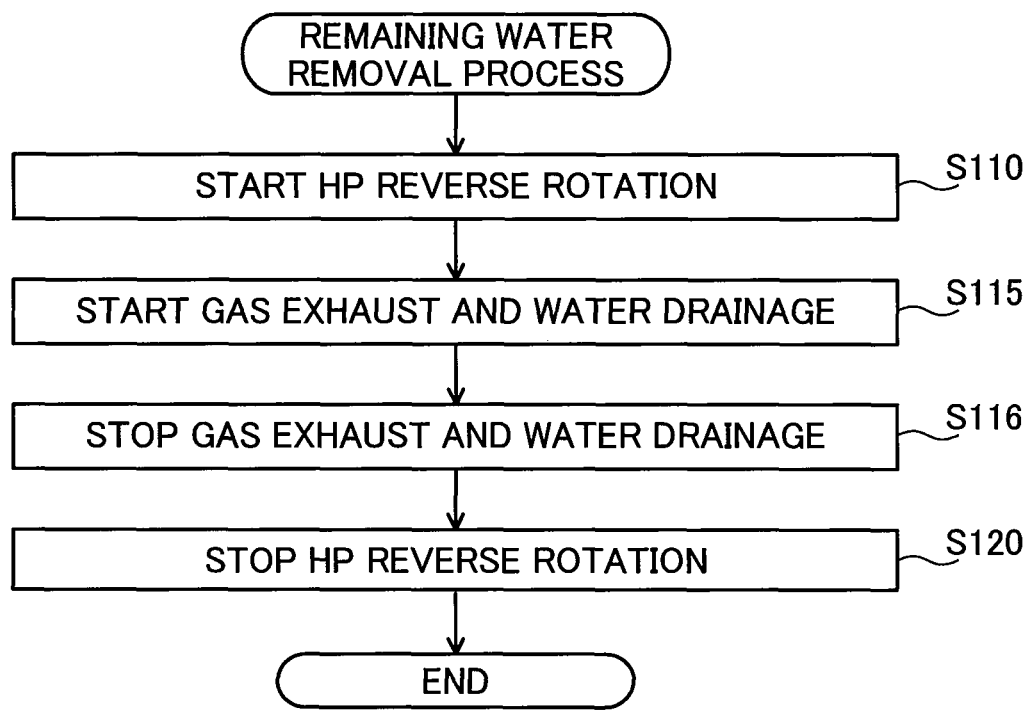
FIG. 7 is a flowchart showing a procedure of the remaining water removal process performed at the system stop time according to a second embodiment.

FIG. 7 is a flowchart showing a procedure of the remaining water removal process performed at the system stop time according to a second embodiment. The configuration of a fuel cell system that performs the remaining water removal process of the second embodiment is identical with the configuration of the fuel cell system 10 of the first embodiment (shown in FIG. 1).

When the remaining water removal process is triggered, the controller 90 starts the reverse rotation of the hydrogen pump 55 (step S110) like the remaining water removal process of the first embodiment (shown in FIG. 3) and opens the drainage shutoff valve 57 to start gas exhaust and water drainage (step S115). After elapse of a predetermined time period, the controller 90 closes the drainage shutoff valve 57 to stop the gas exhaust and water drainage (step S116). This causes the liquid water discharged from the hydrogen pump 55 and the remaining water accumulated in the exhaust/drainage portion 563 to be discharged to outside. The process of step S110 and the process of step S115 may be started simultaneously or may be started in a reverse sequence to that of the sequence shown in FIG. 7. The reverse rotation of the hydrogen pump 55 continues in the closed position of the drainage shutoff valve 57 (i.e., the remaining water removal process of the first embodiment shown in FIG. 3 is performed). After elapse of a predetermined time period, the controller 90 stops the reverse rotation of the hydrogen pump 55 (step S120) and terminates this process. This causes the liquid water remaining in the exhaust/drainage portion 563 after the gas exhaust and water drainage to the outside (step S116) to be blown off from the exhaust/drainage portion 563.

As described above, the configuration of the second embodiment opens the drainage shutoff valve 57 during the HP reverse rotation, so as to discharge the liquid water discharged from the hydrogen pump 55 and the remaining water accumulated in the exhaust/drainage portion 563, to the outside and additionally blow of the liquid water remaining in the exhaust/drainage portion 563. This configuration more effectively suppresses the liquid water from remaining in the exhaust/drainage portion 563, compared with the configuration of the first embodiment. The configuration of the second embodiment more effectively suppresses the drainage shutoff valve 57 from being inoperable due to freezing of the remaining water in the exhaust/drainage portion 563 and thereby more effectively suppresses the fuel cell system from being inoperable.

The start timing of the remaining water removal process described in the first embodiment may be similarly applied to the remaining water removal process of the second embodiment.

C. Third Embodiment

Figure 8:
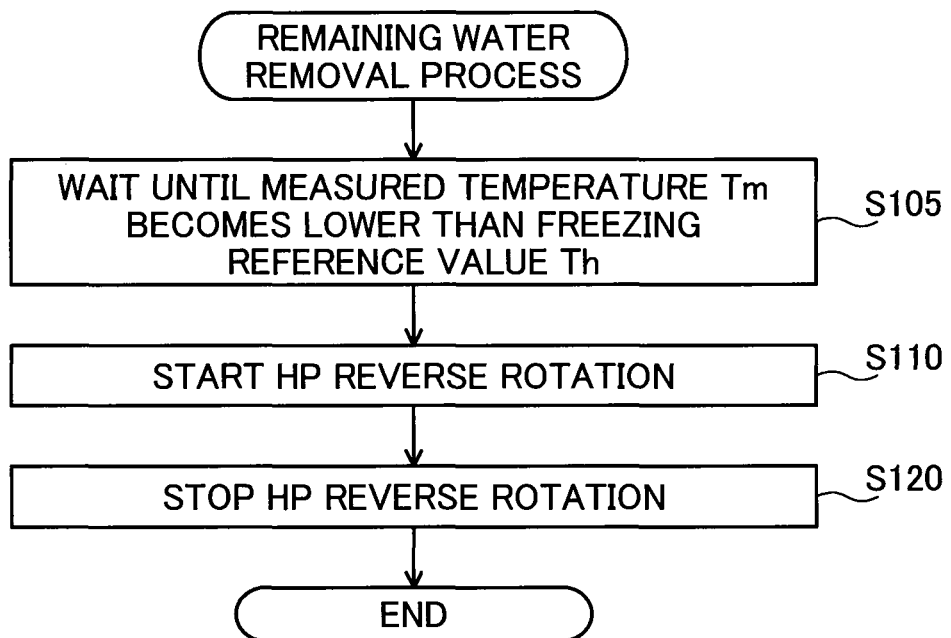
FIG. 8 is a flowchart showing a procedure of the remaining water removal process performed at the system stop time according to a third embodiment.

FIG. 8 is a flowchart showing a procedure of the remaining water removal process performed at the system stop time according to a third embodiment. The configuration of a fuel cell system that performs the remaining water removal process of the third embodiment is identical with the configuration of the fuel cell system 10 of the first embodiment (shown in FIG. 1).

The remaining water removal process of the third embodiment additionally includes a process of waiting until a temperature Tm measured to determine the likelihood of freezing (measured temperature Tm) becomes lower than a freezing reference value Th (step S105), prior to starting the HP reverse rotation (step S110) in the remaining water removal process of the first embodiment (shown in FIG. 3). This additional process may be regarded as a process of determining whether a predetermined condition is satisfied, in order to detect the start timing of the remaining water removal process.

The remaining water removal process of the third embodiment additionally includes the process of step S105. When the remaining water in the exhaust/drainage portion 563 is likely to be frozen, the remaining water removal process of the third embodiment causes the liquid water accumulated in the hydrogen pump 55 to be discharged from the hydrogen pump 55 and blows off the remaining water in the exhaust/drainage portion 563. When the remaining water in the exhaust/drainage portion 563 is unlikely to be frozen, on the other hand, the remaining water removal process of the third embodiment does not blow off the remaining water in the exhaust/drainage portion 563. Unless the remaining water is frozen, the drainage shutoff valve 57 does not become inoperable and the fuel cell system 10 does not become inoperable. There is accordingly no need to perform the remaining water removal process. When the remaining water is likely to be frozen, on the other hand, the remaining water is to be removed, in order to suppress the drainage shutoff valve 57 from being inoperable.

The temperature Tm measured to determine the likelihood of freezing may be any of various environmental temperatures in the fuel cell system, for example, the temperature of cooling water in the cooling water discharge flow path 83 measured by the thermometer 85, the temperature of cooling water in the cooling water supply flow path 84 measured by the thermometer 86 (as shown in FIG. 1), the temperature of the fuel cell 20, the temperature of the hydrogen pump 55, the temperature of the gas liquid separator 56, or the atmosphere temperature of the fuel cell system. The freezing reference value Th may be set to a temperature below which water is likely to be frozen and is set to, for example, a temperature in a 0° C. to 10° C.

As described above, the configuration of the third embodiment blows off the liquid water remaining in the exhaust/drainage portion 563 when the remaining water in the exhaust/drainage portion 563 is likely to be frozen. This configuration effectively suppresses the liquid from remaining in the exhaust/drainage portion 563. This configuration more effectively suppresses the drainage shutoff valve 57 from being inoperable due to freezing of the remaining water in the exhaust/drainage portion 563 and thereby more effectively suppresses the fuel cell system from being inoperable. When the remaining water is unlikely to be frozen, on the other hand, this configuration prevents the remaining water removal process from being unnecessarily performed.

The foregoing describes the remaining water removal process of the third embodiment (shown in FIG. 8) additionally including the process of waiting until the remaining water is likely to be frozen (step S105) comparing to the remaining water removal process of the first embodiment. The process of waiting until the remaining water is likely to be frozen may similarly be applicable to the remaining water removal process of the second embodiment (shown in FIG. 7).

The foregoing describes the remaining water removal process of the third embodiment (shown in FIG. 8) that is performed in place of the remaining water removal process of the first embodiment (shown in FIG. 3) or the remaining water removal process of the second embodiment (shown in FIG. 7). The remaining water removal process of the third embodiment (shown in FIG. 8) may, however, be performed along with the remaining water removal process of the first embodiment and/or the remaining water removal process of the second embodiment.

D. Fourth Embodiment

Figure 9:
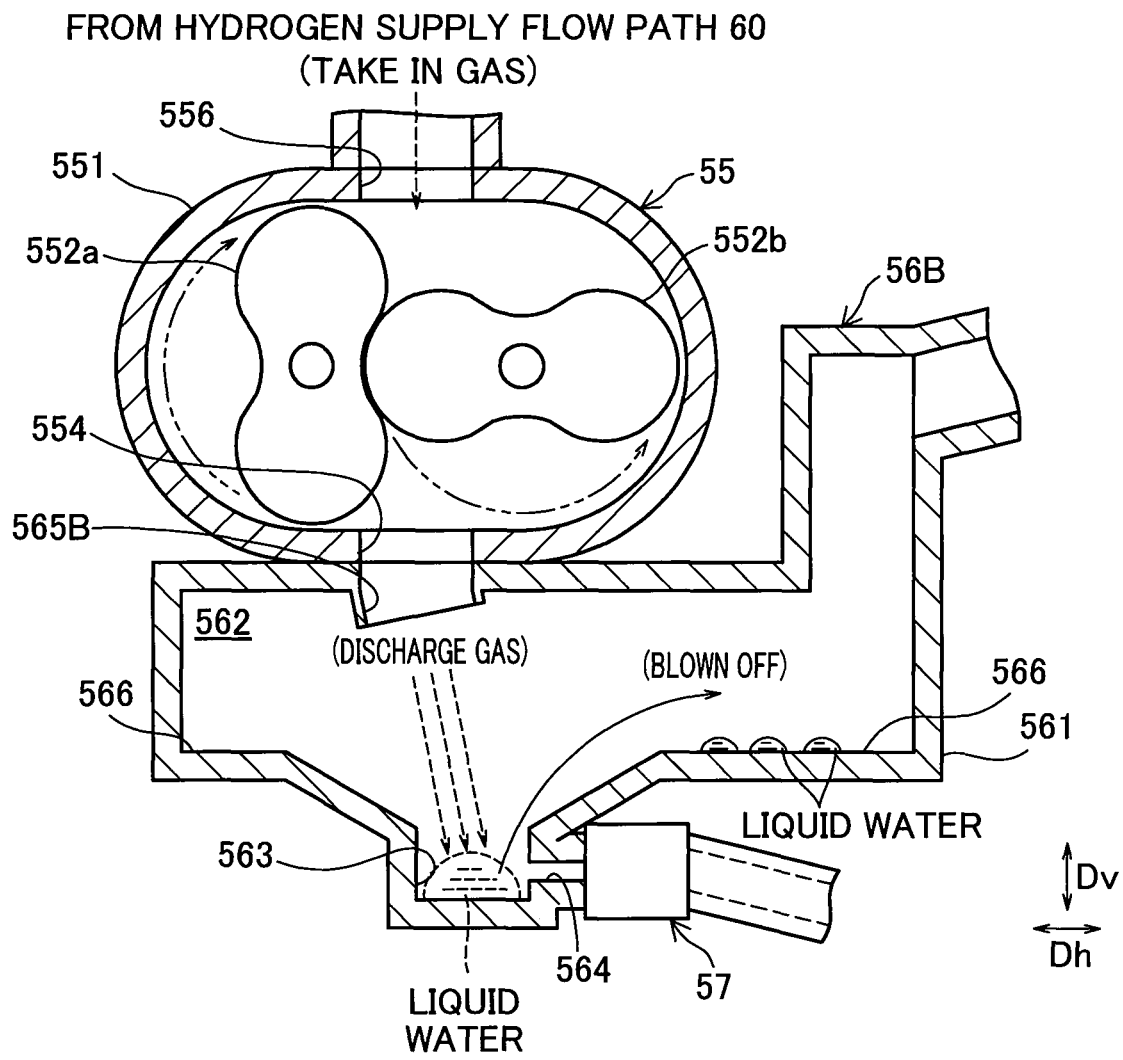
FIG. 9 is a schematic configuration diagram illustrating a positional relationship between the hydrogen pump, a gas liquid separator, and the drainage shutoff valve according to a fourth embodiment.

FIG. 9 is a schematic configuration diagram illustrating a positional relationship between the hydrogen pump 55, a gas liquid separator 56B and the drainage shutoff valve 57 according to a fourth embodiment. The diagram of FIG. 9 corresponds to the schematic configuration diagram (of FIG. 2) illustrating the positional relationship between the hydrogen pump 55, the gas liquid separator 56, and the drainage shutoff valve 57 according to the first embodiment. A fuel cell system of the fourth embodiment has a similar configuration to that of the fuel cell system 10 of the first embodiment (shown in FIG. 1), except the positional relationship between the hydrogen pump 55, the gas liquid separator 56B and the drainage shutoff valve 57 shown in FIG. 9.

The positional relationship between the hydrogen pump 55, the gas liquid separator 56B and the drainage shutoff valve 57 according to the fourth embodiment is similar to the positional relationship between the hydrogen pump 55, the gas liquid separator 56, and the drainage shutoff valve 57 according to the first embodiment, except differences 1 and 2 given below.

Difference 1: In the gas liquid separator 56 of the first embodiment (shown in FIG. 2), the opening 565 is located above the exhaust/drainage portion 563 in the vertical direction Dv. In the fourth embodiment, on the other hand, an opening 565B of the gas liquid separator 56B is located at a position deviated along the horizontal direction Dh from a position above the exhaust/drainage portion 563 in the vertical direction Dv.

Difference 2: In the fourth embodiment, the opening 565B of the gas liquid separator 56B is configured such that a gas stream is generated from the opening 565B connected with the intake port 554 of the hydrogen pump 55 toward the exhaust/drainage portion 563 located at a position different from a position vertically below the opening 565B during the HP reverse rotation. In other words, the opening 565B is configured to face in the direction of the exhaust/drainage portion 563.

In the above configuration, when the hydrogen pump 55 is reversely rotated (HP reverse rotation) in directions shown by two-dot chain line arrows in FIG. 9, the gas stream in the reverse direction is generated from the opening 565B toward the exhaust/drainage portion 563 as shown by broken line arrows in FIG. 9. The liquid water accumulated in the hydrogen pump 55 is discharged from the hydrogen pump 55 to the gas liquid separator 56B by this gas stream in the reverse direction and the gravitational force. The gas from the opening 565B is sprayed onto the liquid water discharged from the hydrogen pump 55 and the remaining water accumulated in the exhaust/drainage portion 563, so as to blow off the remaining water from the exhaust/drainage portion 563 as shown by solid line arrows. This configuration suppresses the drainage shutoff valve 57 from being inoperable due to freezing of the remaining water in the exhaust/drainage portion 563 and thereby suppresses the fuel cell system from being inoperable.

The modified configurations of the liquid receiving surface 566 described in the first embodiment (shown in FIGS. 5 and 6) may be applied to the fourth embodiment. The respective remaining water removal processes described in the first to the third embodiments (shown in FIGS. 3, 7 and 8) and their modifications may be applied to the fourth embodiment.

E. Modifications

The present disclosure is not limited to the embodiments and their modifications described above but may be implemented in various aspects without departing from the scope of the disclosure. Some of possible modifications are given below.

E1. Modification 1

The first embodiment and the fourth embodiment describe the configurations including the liquid receiving surface that receives and holds the liquid water blown off into the internal space of the gas liquid separator. The gas liquid separator may, however, be configured without such a liquid receiving surface. When the blown-off liquid water is in a small mass, this modified configuration still enables the blown-off liquid water to adhere to and to be held on a wall surface of the internal space and achieves the effect of removing the remaining water from the exhaust/drainage portion.

E2. Modification 2

In the above description, the remaining water removal processes of the first to the third embodiments are performed independently. For example, the remaining water removal process of the first embodiment may be performed in combination with the remaining water removal process of the third embodiment. The remaining water removal process of the second embodiment may be performed in combination with the remaining water removal process of the third embodiment. All the remaining water removal processes of the first to the third embodiments may be performed in combination. For example, after a stop of the system, the process of the first embodiment may be preformed on satisfaction of a first condition, and the process of the second embodiment may be performed on satisfaction of a second condition. Subsequently, when the liquid water is likely to be frozen in the third embodiment, the remaining water removal process may be performed.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the present disclosure, there is provided a fuel cell system. This fuel cell system comprises a fuel cell; a supply flow path configured to supply a fuel gas to a supply port of an anode of the fuel cell; a circulation flow path configured to resupply a discharge gas that is discharged from a discharge port of the anode, as the fuel gas to the supply port; a gas liquid separator provided in the circulation flow path and configured to separate the discharged gas into a gas and a liquid; a circulation pump provided in the circulation flow path and configured to supply the gas separated by the gas liquid separator to the supply flow path; a discharge valve connected with the gas liquid separator and configured to discharge the separated liquid from the gas liquid separator; and a controller configured to control operation of the circulation pump. The circulation pump is a two-lobe roots pump configured such that two rotors rotate in opposite directions. An exhaust/drainage portion is provided at a bottom in an internal space of the gas liquid separator and is configured to collect the separated liquid and discharge the collected liquid via the discharge valve. The gas liquid separator includes an opening that is connected with the circulation pump and that is configured to face in a direction of the exhaust/drainage portion. At a system stop time, when a predetermined condition is satisfied, the controller causes the rotors of the circulation pump to be rotated in reverse directions from rotations at a system operation time.

The fuel cell system of this aspect enables the remaining water in the exhaust/drainage portion to be blown off by rotation of the rotors of the circulation pump at the system stop time. This configuration reduces the remaining water in the exhaust/drainage portion. As a result, this configuration reduces the possibility that the system is inoperable due to freezing of the remaining water.

(2) In the fuel cell system of the above aspect, the opening of the gas liquid separator may be placed above the exhaust/ drainage portion in a vertical direction and may be configured to face downward in the vertical direction.

The fuel cell system of this aspect enables the remaining water in the exhaust/drainage portion to be blown off efficiently.

(3) In the fuel cell system of the above aspect, the gas liquid separator may include a liquid receiving surface that is provided above the exhaust/drainage portion in the internal space. The liquid receiving surface may be configured by a horizontal surface or a by a surface including an inclined surface that is inclined more downward on an outer circumferential side.

In the fuel cell system of this aspect, the blown-off liquid water is received and held by the liquid receiving surface. This configuration suppresses the blown-off liquid water from flowing down to the exhaust/drainage portion.

(4) In the fuel cell system of the above aspect, the controller may open the discharge valve when rotating the rotors in the reverse directions.

The fuel cell system of this aspect causes the remaining water to be discharged via the discharge valve, while blowing off the remaining water in the exhaust/drainage portion. This configuration enables the remaining water to be reduced more efficiently.

(5) In the fuel cell system of the above aspect, the controller may rotate the rotors in the reverse directions when a measured temperature is lower than a freezing reference value at the system stop time.

When the remaining water is likely to be frozen, the fuel cell system of this aspect blows off the remaining water in the exhaust/drainage portion to reduce the remaining water in the exhaust/drainage portion. This configuration effectively reduces the possibility that the system is inoperable due to freezing of the remaining water.

The present disclosure may be implemented by various aspects other than the aspects of the fuel cell system described above, for example, an exhaust/drainage mechanism for the fuel cell system and an exhaust/drainage control method of the fuel cell system.

What is claimed is:

1. A fuel cell system, comprising:
    a fuel cell;
    a supply flow path configured to supply a fuel gas to a supply port of an anode of the fuel cell;
    a circulation flow path configured to resupply a discharge gas that is discharged from a discharge port of the anode, as the fuel gas to the supply port;
    a gas liquid separator provided in the circulation flow path and configured to separate the discharged gas into a gas and a liquid;
    a circulation pump provided in the circulation flow path and configured to supply the gas separated by the gas liquid separator to the supply flow path;
    a discharge valve connected with the gas liquid separator and configured to discharge the separated liquid from the gas liquid separator; and
    a controller programmed to control operation of the circulation pump, wherein
    the circulation pump is a two-lobe roots pump configured such that two rotors rotate in opposite directions,
    an exhaust/drainage portion is provided at a bottom in an internal space of the gas liquid separator and is configured to collect the separated liquid and discharge the collected liquid via the discharge valve,
    the gas liquid separator includes an opening that is connected with the circulation pump and that faces in a direction of the exhaust/drainage portion, and
    at a system stop time, when a predetermined condition is satisfied, the controller is programmed to rotate the two rotors of the circulation pump in reverse directions from rotations at a system operation time to pump gas towards the exhaust/drainage portion of the gas liquid separator.

2. The fuel cell system according to claim 1,
    wherein the opening of the gas liquid separator is placed above the exhaust/drainage portion in a vertical direction and is configured to face downward in the vertical direction.

3. The fuel cell system according to claim 1,
    wherein the gas liquid separator includes a liquid receiving surface that is provided above the exhaust/drainage portion in the internal space, wherein
    the liquid receiving surface is configured by a horizontal surface or a by an inclined surface that is inclined more downward on an outer circumferential side.

4. The fuel cell system according to claim 1,
    wherein the controller opens the discharge valve when rotating the rotors in the reverse directions.

5. The fuel cell system according to claim 1,
    wherein the controller rotates the rotors in the reverse directions when a measured temperature is lower than a freezing reference value at the system stop time.

* * * * *